United States Patent
Bahrami et al.

(10) Patent No.: US 12,019,992 B2
(45) Date of Patent: Jun. 25, 2024

(54) CODE ENRICHMENT FOR TRAINING LANGUAGE MODELS RELATING TO COMPUTER PROGRAMMING

(71) Applicant: FUJITSU LIMITED, Kawasaki-shi (JP)

(72) Inventors: Mehdi Bahrami, San Jose, CA (US); Wei-Peng Chen, Fremont, CA (US)

(73) Assignee: FUJITSU LIMITED, Kawasaki (JP)

( * ) Notice: Subject to any disclaimer, the term of this patent is extended or adjusted under 35 U.S.C. 154(b) by 74 days.

(21) Appl. No.: 17/657,530

(22) Filed: Mar. 31, 2022

(65) Prior Publication Data

US 2023/0106226 A1    Apr. 6, 2023

Related U.S. Application Data

(60) Provisional application No. 63/261,602, filed on Sep. 24, 2021.

(51) Int. Cl.
*G06F 8/60*  (2018.01)
*G06F 8/30*  (2018.01)
(Continued)

(52) U.S. Cl.
CPC .............. *G06F 40/30* (2020.01); *G06F 8/30* (2013.01); *G06F 8/36* (2013.01); *G06F 8/42* (2013.01);
(Continued)

(58) Field of Classification Search
None
See application file for complete search history.

(56) References Cited

U.S. PATENT DOCUMENTS

| 2014/0163962 A1* | 6/2014 | Castelli | G06F 40/216 704/9 |
| 2019/0079752 A1* | 3/2019 | Makkar | G06F 8/73 |
| 2020/0065383 A1* | 2/2020 | Hadi | G06N 3/044 |

FOREIGN PATENT DOCUMENTS

WO    WO-2021201953 A1 *  10/2021  ............. G06F 16/95

OTHER PUBLICATIONS

Daniel Otter et al., A Survey of the Usages of Deep Learning for Natural Language Processing, 2019, IEEE, pp. 1-22. Retrieved from the Internet: <URL: https://arxiv.org/pdf/1807.10854.pdf>. (Year: 2019).*

(Continued)

*Primary Examiner* — Hanh Thi-Minh Bui
(74) *Attorney, Agent, or Firm* — Fujitsu Intellectual Property Center

(57) ABSTRACT

According to an aspect of an embodiment, operations for code enrichment for training language models on tasks related to computer programming are provided. The operations include receiving source code data including a computer-executable code and a natural language (NL) text. The operations further include determining blocks of code from the computer-executable code. The operations further include extracting a set of features related to components of the source code data from the blocks of code. The extraction is performed by parsing the blocks of code using Abstract Syntax Tree (AST) data of the blocks of code. The operations further include revising the AST data. The operations further include updating the source code data based on the revised AST data and generating a dataset of NL and abstracted code features as training data based on the updated source code data and further training a language model on a sequence-to-sequence generation task.

20 Claims, 8 Drawing Sheets

(51) Int. Cl.

| | |
|---|---|
| *G06F 8/36* | (2018.01) |
| *G06F 8/41* | (2018.01) |
| *G06F 8/65* | (2018.01) |
| *G06F 8/73* | (2018.01) |
| *G06F 11/36* | (2006.01) |
| *G06F 16/951* | (2019.01) |
| *G06F 18/20* | (2023.01) |
| *G06F 18/22* | (2023.01) |
| *G06F 18/23213* | (2023.01) |
| *G06F 40/166* | (2020.01) |
| *G06F 40/211* | (2020.01) |
| *G06F 40/216* | (2020.01) |
| *G06F 40/242* | (2020.01) |
| *G06F 40/30* | (2020.01) |
| *G06F 40/40* | (2020.01) |
| *G06F 40/44* | (2020.01) |
| *G06N 3/04* | (2023.01) |
| *G06N 3/08* | (2023.01) |

(52) U.S. Cl.
CPC ............ *G06F 8/436* (2013.01); *G06F 8/65* (2013.01); *G06F 8/73* (2013.01); *G06F 11/3624* (2013.01); *G06F 16/951* (2019.01); *G06F 18/22* (2023.01); *G06F 18/23213* (2023.01); *G06F 18/285* (2023.01); *G06F 40/166* (2020.01); *G06F 40/211* (2020.01); *G06F 40/216* (2020.01); *G06F 40/242* (2020.01); *G06F 40/40* (2020.01); *G06F 40/44* (2020.01); *G06N 3/04* (2013.01); *G06N 3/08* (2013.01)

(56) References Cited

OTHER PUBLICATIONS

Ling, W et al., "Latent Predictor Networks for Code Generation," arXiv:1603.06744v2, Jun. 8, 2016, 11 pages.

Shin, R., et al., "Program Synthesis and Semantic Parsing with Learned Code Idioms," 33rd Conference on Neural Information Processing Systems (NeurIPS 2019), Vancouver, Canada, arXivL1906. 10816v4, Nov. 5, 2019, 11 pages.

Guo, D., et al., "CodeXGLUE: Machine Learning Benchmark Dataset for Code Understanding and Generation," (2021), printout from GitHub repository, https://github.com/microsoft/CodeXGLUE, accessed Mar. 29, 2022, 3 pages.

"Language Model—Wikipedia" printout from en.Wikipedia.org, https://en.wikipedia.org/wiki/Language_model, accessed Mar. 29, 2022, 5 pages.

Ling, W., "Collectible Card Game to Code Dataset," (2017), printout from GitHub repository, https://github.com/deepmind/card2code, accessed Mar. 29, 2022, 3 pages.

Yin, P., et al., "Learning to Mine Aligned Code and Natural Language Pairs from Stack OverFlow," CoNaLa Corpus v1.1, (2018) downloaded from Conala-Corpus.github.io, on Mar. 29, 2022, 16 slides.

Feng, T., et al., "Program Synthesis using Conflict-Driven Learning," PLDI'18, Jun. 18-22, 2018, Philadelphia, PA, USA, Association for Computing Machinery (2018), 16 pages, available at https://doi.org/10.1145/3192366.3192382.

Feng, Z., et al., "CodeBERT: A Pretrained Model for Programming and Natural Languages," arXiv:2002.08155v4, Sep. 18, 2020, 12 pages.

Devlin, J., "BERT: Pre-Training of Deep Bidirectional Transformers for Language Understanding," arXiv:1810.04805v2, May 24, 2019, 16 pages.

Yin, P., "TRANX: A Transition-based Neural Abstract Syntax Parser for Semantic Parsing and Code Generation," arXiv:1810. 02720v1, Oct. 5, 2018, 6 pages.

\* cited by examiner

CODE ENRICHMENT FOR TRAINING LANGUAGE MODELS RELATING TO COMPUTER PROGRAMMING

CROSS-REFERENCE TO RELATED APPLICATIONS/INCORPORATION BY REFERENCE

This application claims priority to U.S. Provisional Patent Application Ser. No. 63/261,602 filed on Sep. 24, 2021, titled, "Library Corpus for Large-Scale Language Models and Code Retrieval Models Using Augmented Code," the entire content of which is hereby incorporated herein by reference.

FIELD

The embodiments discussed in the present disclosure are related to code enrichment for training language models relating to computer programming.

BACKGROUND

With advancements in machine learning, various language models have been developed for different machine-programming tasks, such as code retrieval, code cloning, or code synthesis. A language model is a statistical representation of probability distribution for a sequence of words where it aims to find relation between different words by processing a large corpora. Some language models aim to learn general-purpose representations that support downstream Natural Language-Programming language (NL-PL) applications such as natural language code search, code synthesis, or code documentation generation. However, processing only source-codes through words and relation to other words is not enough for understanding source code of different programming languages. Without any improvement in the learning of the language models, the performance of the language models may be weaker than expected, which may eventually impact the performance of downstream tasks, such as code synthesis.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, operations may include receiving source code data including a computer-executable code and a natural language (NL) text associated with the computer-executable code. The operations may further include determining blocks of code from the computer-executable code and extracting a set of features related to components of the source code data from the blocks of code. The extraction is performed by parsing the blocks of code using Abstract Syntax Tree (AST) data of the blocks of code. The operations may further include revising the AST data by abstracting nodes of the AST data. The nodes may be abstracted based on the extracted set of features and a level of abstraction to be achieved for each of the nodes. The operations may further include updating the source code data based on the revised AST data, and generating a dataset of NL and abstracted code features as training data based on the updated source code data. Thereafter, the operations may include training a language model on a sequence-to-sequence generation task based on the generated dataset.

The objective and advantages of the embodiments will be realized and achieved at least by the elements, features, and combinations particularly pointed out in the claims.

It is to be understood that both the foregoing general description and the following detailed description are merely examples and explanatory and are not restrictive of the invention, as claimed.

BRIEF DESCRIPTION OF THE DRAWINGS

Example embodiments will be described and explained with additional specificity and detail through the use of the accompanying drawings in which.

Figure 1:
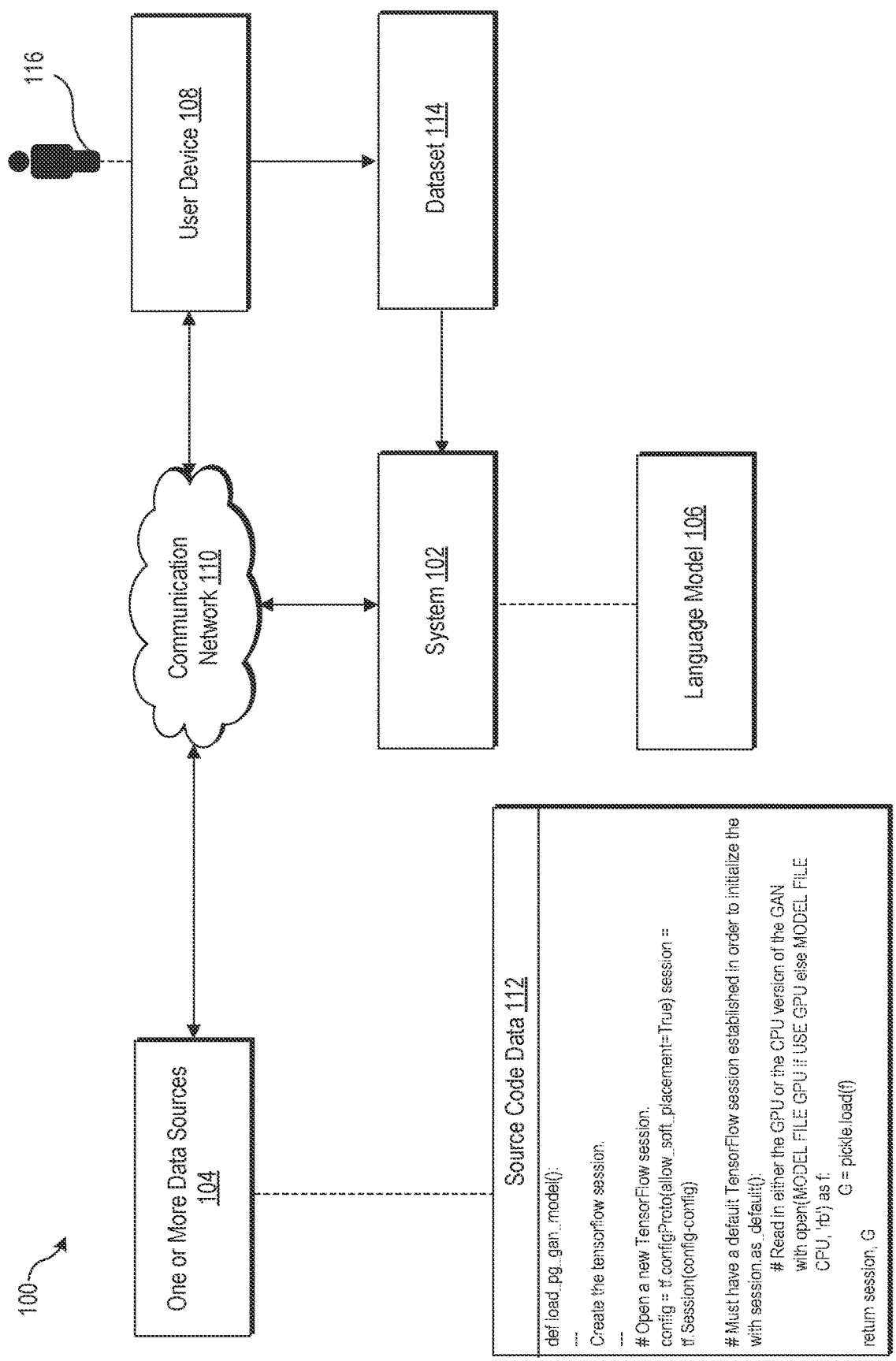
FIG. 1 is a diagram representing an exemplary environment related to code enrichment for training language models on tasks related to computer programming.

all according to at least one embodiment described in the present disclosure.

DESCRIPTION OF EMBODIMENTS

Advancements in machine learning and artificial intelligence have led to development of language models for various machine programming tasks. A language model is typically a probabilistic model that provides a statistical representation of probability distribution for a sequence of words where it aims to find relation between different words by processing a large corpora of text (e.g., executable code). For instance, the language model may be able to predict the likelihood of word "pandas" appears after "import" as such "from nbconvert.preprocessors import ExecutePreprocessor". Specifically, given a sequence of length "m", the language model may assign a probability $P(w_1, w_2, \ldots w_m)$ to the whole sequence.

Language models are being used in a variety of sequence-to-sequence generation tasks or machine programming tasks, such as code retrieval, code annotation, code cloning, and code synthesis. The task of code retrieval corresponds to retrieval of code snippets relevant to a given natural language query from a code base. The task of code annotation corresponds to annotation of a code snippet with a natural language description, and the task of code synthesis corresponds to generation of a source-code based on a natural language query.

For each machine programming task, the language model has to be trained on a dataset prepared for the respective task. Current solutions for training of the language models use only source-codes and corresponding natural language description. The training of these language models using only source-codes through words natural language description may not be enough for understanding the source-codes in different programming languages.

The disclosure uses abstract syntax trees (ASTs) data along with the source codes to train or fine-tune the language models. The abstract syntax tree (AST) data may include the ASTs, each of which may be a tree representation of the abstract syntactic structure of text (often source code) and may be written in a formal language (such as the programming language). Each node of the tree in the AST may denote a construct that may be occurring in the text. Also, AST data may include data related to each word in source-code (i.e., variable, function), connection to other words through a tree structure (i.e., input parameters of a function, type of input parameters). Typically, the AST of a source-code must be verified by a compiler/an interpreter before executing the source-code.

The disclosure further describes about training the language models with a source-code representation that integrates AST data of the source code and other important information. The additional information from AST may allow language models to provide detailed insights of the source-codes rather than looking into words as a simple tokens and their statistics orders. Therefore, an objective of the disclosure is to generate a new type of presentation of source-codes for language models where it embeds Abstract Syntax Tree (AST) information into the original source-code. This improvement in language models may directly impact into the performance of downstream task of code synthesis. Moreover, the disclosure further provides an enhanced language model that may be used in generating new code based on existing code and may be for more efficient and robust as compared to existing language models. Also, this enhanced language model may be used in software development.

In contrast to existing solutions, the language model generated by using AST data may be more generalized, efficient, and accurate as compared to a language model generated without incorporating AST data. Due to the addition of the AST data in the training of the language model, the language model may have detailed information about the source codes. For example, based on the AST data, the language model may be able to predict the names of the functions (i.e. the built-in functions as well as the user-defined functions). Along with an improvement in the accuracy of the language model, the disclosure may enhance resource computation utilization where it supervises a deep learning model for pre-training a language model because each token includes detail info of programming code (i.e., type of function or package name) rather than a simple word. For example, the language model may learn about "x.to_csv( )" and "y.to_csv( )" functions in a corpora much better when the same is revised as "pd.DataFrame.x.to_csv( )" and "pd.DataFrame.y.to_csv( )".

Embodiments of the present disclosure are explained with reference to the accompanying drawings.

FIG. 1 is a diagram representing an exemplary environment related to code enrichment for training language models on tasks related to computer programming, arranged in accordance with at least one embodiment described in the present disclosure. With reference to FIG. 1, there is shown an example environment 100. In the example environment 100, there is shown a system 102 and one or more data sources 104. There is further shown a language model 106, a user device 108, a communication network 110, source code data 112, and a dataset 114. The system 102, the one or more data sources 104, and the user device 108 may be communicatively coupled to each other, via the communication network 110. There is further shown a user 116 who may be associated with the user device 108. Examples of the user device 108 may include, but are not limited to, a mobile device, a desktop computer, a laptop, or a computer workstation. In one or more embodiments, the user device 108 may include a user-end terminal device and a server communicatively coupled to the user-end terminal device. Examples of the user-end terminal device may include, but are not limited to, a mobile device, a desktop computer, a laptop, or a computer workstation.

The one or more data sources 104 may include suitable logic, circuitry, and interfaces that may be configured to store the source code data 112. The source code data 112 may include a computer-executable code and a natural language (NL) text that may be associated with the computer-executable code. In an embodiment, the computer-executable code may be associated with an open-source software (OSS) project. By way of example, and not limitation, the one or more data sources 104 may include a web-based code hosting server, a database server, a file server, a web server, a Really Simple Syndication (RSS) feed, a server that hosts website(s) and web application(s) related to repositories (which store software code).

In an embodiment, the one or more data sources 104 may be implemented as servers, which may include a storage distributed across one or more availability zones (e.g., datacenters). In an embodiment, each data source may include a front-end system and a back-end system. The front-end system may be configured to provide an interface (such as webpages or a client-side interface of a web-application) to view information associated with the source code data 112. The back-end system may store databases, logic, and instructions to display content on the interface provided by the front-end system.

The language model 106 may be a probabilistic model that may be trained to generate probability distribution over sequences on a set of code tokens. The language model 106 may be one of a statistical language model or a neural language model. The statistical language model may use statistical techniques to learn the probability distribution of words. These statistical techniques may include but are not limited to, a unigram technique, a N-gram technique, a Hidden Markov Models (HMM) and other linguistic rules. Details about the implementation of the above-mentioned statistical techniques are known in the art. Therefore, detailed description of the above-mentioned statistical techniques has been omitted for the sake of brevity.

The neural language model may use one or more neural networks to learn the probability distribution of words. In an embodiment, each of the one or more neural networks included in the neural language model may be a computational network or a system of artificial neurons (also referred to as nodes) that may be arranged in a plurality of layers. The plurality of layers of the neural network may include an input layer, one or more hidden layers, and an output layer. Each layer of the plurality of layers may include one or more nodes (or artificial neurons, represented by circles, for example). Outputs of all nodes in the input layer may be coupled to at least one node of hidden layer(s). Similarly, inputs of each hidden layer may be coupled to outputs of at least one node in other layers of the neural network. Outputs of each hidden layer may be coupled to inputs of at least one node in other layers of the neural network. Node(s) in the final layer may receive inputs from at least one hidden layer to output a result. The number of layers and the number of nodes in each layer may be determined from hyper-parameters of the neural network. Such hyper-parameters may be set before, while training, or after training the neural network on a training dataset.

Each node of the neural network may correspond to a mathematical function (e.g., a sigmoid function or a rectified linear unit) with a set of parameters, tunable during training of the network. The set of parameters may include, for example, a weight parameter, a regularization parameter, and the like. Each node may use the mathematical function to compute an output based on one or more inputs from nodes in other layer(s) (e.g., previous layer(s)) of the neural network. All or some of the nodes of the neural network may correspond to a same or different mathematical function.

In training of the neural network, one or more parameters of each node of the neural network may be updated based on whether an output of the final layer for a given input (from the training dataset) matches a correct result based on a loss function for the neural network. The above process may be repeated for same or a different input till a minima of loss function is achieved, and a training error is minimized. Several methods for training are known in art, for example, gradient descent, stochastic gradient descent, batch gradient descent, gradient boost, meta-heuristics, and the like.

The neural language model may include electronic data, which may be implemented as, for example, a software component of an application executable on the system 102. The neural language model may rely on libraries, external scripts, or other logic/instructions for execution by a processing device, such as processor. The neural language model may include code and routines configured to enable a computing device, such as the processor to perform one or more operations for generation of the one or more lines of computer-executable code for a natural language query as an input to the neural language model. Additionally, or alternatively, the neural language model may be implemented using hardware including, but not limited to, a processor, a microprocessor (e.g., to perform or control performance of one or more operations), a field-programmable gate array (FPGA), or an application-specific integrated circuit (ASIC). Alternatively, in some embodiments, the neural language model may be implemented using a combination of hardware and software.

Examples of each of the one or more neural networks may include, but are not limited to, a deep neural network (DNN), a convolutional neural network (CNN), a recurrent neural network (RNN), a CNN-recurrent neural network (CNN-RNN), an artificial neural network (ANN), a Long Short Term Memory (LSTM) network based RNN, LSTM+ ANN, a gated recurrent unit (GRU)-based RNN, a fully connected neural network, a Connectionist Temporal Classification (CTC) based RNN, a deep Bayesian neural network, and/or a combination of such networks. In certain embodiments, each of the one or more neural networks may be based on a hybrid architecture of multiple Deep Neural Networks (DNNs).

In an embodiment, the language model 106 may correspond to a DNN that uses an encoder-decoder architecture. The DNN may be trained to generate one or more lines of computer-executable code for a natural language query as an input to the language. Specifically, such a language model may include an encoder neural network and a decoder neural network. Examples of such a DNN may include, but are not limited to, a Long Short Term Memory (LSTM) network, a gated recurrent unit (GRU) network, a transformer model, or a variant of the transformer model, such as such as a Bidirectional Encoder Representations from Transformers (BERT) or CodeBERT.

In operation, the system 102 may be configured to receive source code data 112. As discussed, the source code data 112 may include the computer-executable code and the natural language (NL) text that may be associated with the computer-executable code. In an embodiment, the NL text associated with the computer-executable code may correspond to metadata associated with the computer-executable code. In another embodiment, the NL text may correspond to a description of the computer-executable code or comment(s) (or user comments) added in computer-executable code. In another embodiment, the NL text may correspond to a docstring that may be included in the computer-executable code.

In an embodiment, the system 102 may be configured to determine a structure of the computer-executable code that may be included in the received source code data 112. For example, the system 102 may follow a top-down approach to determine a complexity of the computer-executable code. Specifically, the system 102 may be configured to determine one or more libraries import in the computer-executable code. After determining such libraries, instances of one or more classes and function(s) of each of such classes may be determined. Details about the structure of the computer-executable code are provided, for example, in FIG. 3. The system 102 may be further configured to determine blocks of code from the computer-executable code. Each block of code may correspond to a subset of the computer-executable code and may include at least one of a class, a function, a nested block of lines of code, a single line of code, or a loop from the computer-executable code. Details about the blocks of code are provided for example, in FIG. 4.

Based on the determination of the blocks of code, the system 102 may be further configured to extract a set of features from the blocks of code. Such features may be related to components of the source code data 112. The components of the source code data 112 may include, for example, a library, a class, a user-defined function (or a method), a programming language built-in function (or method), a variable (or an argument), and the like. In an embodiment, the extraction of the set of features may be performed by parsing the blocks of code using Abstract Syntax Tree (AST) data of the blocks of code. AST data may correspond to a tree representation of the abstract syntactic structure of the blocks of code in a particular programming language, such as Python, Java®, or JavaScript. Each node of the tree may denote a construct that may occur in the block of code. Details about the extraction of the set of features are provided, for example, in FIGS. 5, 6, 7, and 8.

The system 102 may be further configured to revise the AST data by abstracting nodes of the AST data. The nodes of the AST data may be abstracted based on the extracted set of features and a level of abstraction to be achieved for each of the nodes. The level of abstraction may be performed by selecting a node of the AST data and further determining a type of the selected node. The system 102 may select the level of abstraction based on the type of the node and an abstract grammar for the programming language used in the source code data 112. The system may further filter attributes of the selected node based on the selected level of abstraction. Details about the revision of the AST data are provided, for example, in FIG. 4, and FIG. 9.

Based on the revision of the AST data, the system 102 may be further configured to update the source code data 112. Specifically, the updated source code data may correspond to abstracted source code data 112. In an embodiment, the source code data 112 may be updated based on removal of one or more lines of code from the source code data. The one or more lines of code may be associated with nodes which are processed using the AST.

After revising the source code data 112, the system 102 may generate the dataset 114 of NL and abstracted code features as training data, based on the updated source code data. The abstracted code features may be generated based on the updated source code. The system 102 may train the language model 106 on a sequence-to-sequence generation task based on the generated dataset 114. The sequence-to-sequence generation task may include, for example, a code synthesis task, a code generation task, a code enrichment task, a code cloning task, a code retrieval task, and the like. Details about the dataset and training of the language model 106 are provided, for example, in FIG. 10.

It should be noted that the communication between the system 102, the one or more data sources 104, the language model 106, and the user device 108 may be performed via the communication network 110. The communication network 110 may include a communication medium through which the system 102 may communicate with the one or more data sources 104, the language model 106, the user device 108, and/or different devices (not shown). Examples of the communication network 110 may include, but are not limited to, the Internet, a cloud network, a cellular network (such as a $4^{th}$ Generation Long-Term Evolution (LTE) or $5^{th}$ generation New Radio (NR)), a Wireless Fidelity (Wi-Fi) network, a Personal Area Network (PAN), a Local Area Network (LAN), and/or a Metropolitan Area Network (MAN). Various devices in the example environment 100 may be configured to connect to the communication network 110, in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), ZigBee, EDGE, IEEE 802.11, light fidelity (Li-Fi), 802.16, IEEE 802.11s, IEEE 802.11g, multi-hop communication, wireless access point (AP), device to device communication, cellular communication protocols, and/or Bluetooth (BT) communication protocols, or a combination thereof.

Modifications, additions, or omissions may be made to the system 102 without departing from the scope of the present disclosure. For example, in some embodiments, the system 102 may include any number of other components that may not be explicitly illustrated or described.

Figure 2:
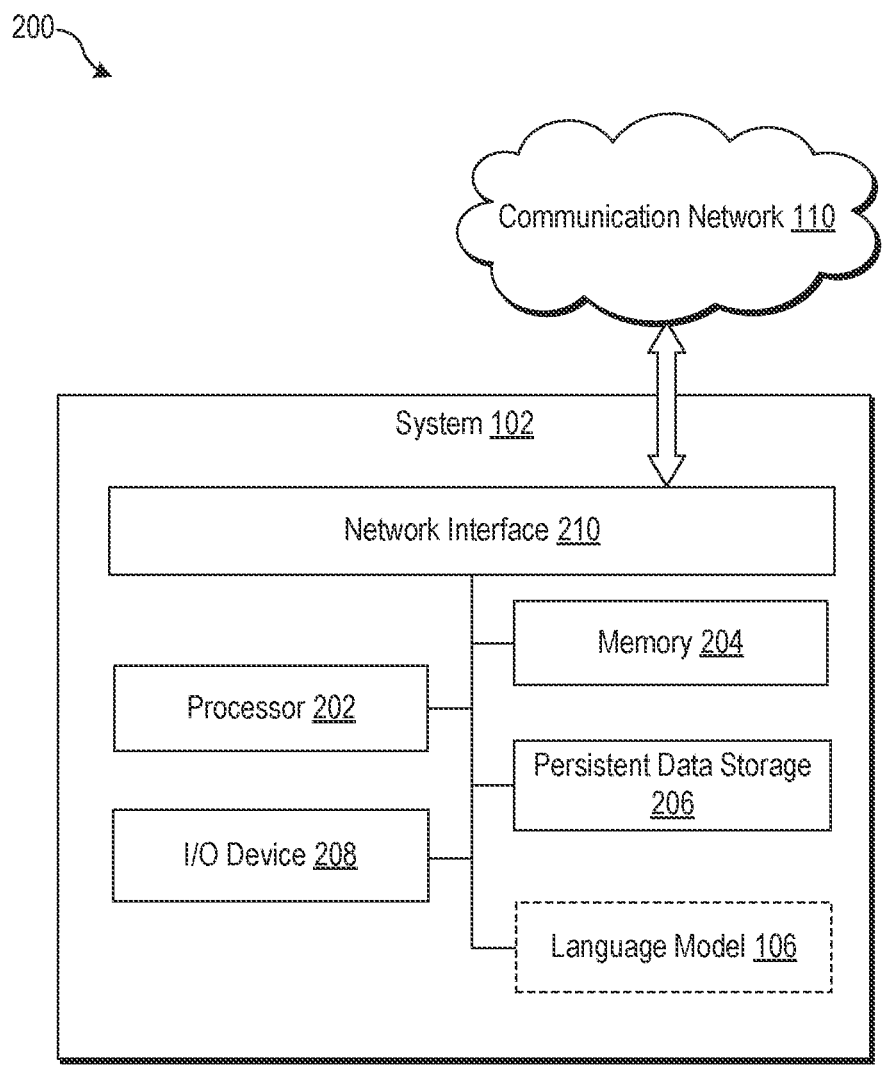
FIG. 2 is a block diagram of a system for code enrichment for training language models on tasks related to computer programming.

FIG. 2 is a block diagram of a system for code enrichment for training language models on tasks related to computer programming, arranged in accordance with at least one embodiment described in the present disclosure. FIG. 2 is explained in conjunction with elements from FIG. 1. With reference to FIG. 2, there is shown a block diagram 200 of the system 102 of FIG. 1. The block diagram 200 may further include a processor 202, a memory 204, a persistent data storage 206, an I/O block 208, a network interface 210, and the language model 106.

The processor 202 may include suitable logic, circuitry, and/or interfaces that may be configured to execute program instructions associated with different operations to be executed by the system 102. The processor 202 may include any suitable special-purpose or general-purpose computer, computing entity, or processing device, including various computer hardware or software modules, and may be configured to execute instructions stored on any applicable computer-readable storage media. For example, the processor 202 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. Although illustrated as a single processor in FIG. 2, the processor 202 may include any number of processors configured to, individually or collectively, perform or direct performance of any number of operations of the system 102, as described in the present disclosure.

In some embodiments, the processor 202 may be configured to interpret and/or execute program instructions and/or process data stored in the memory 204 and/or the persistent data storage 206. In some embodiments, the processor 202 may fetch program instructions from the persistent data storage 206 and load the program instructions in the memory 204. After the program instructions are loaded into memory 204, the processor 202 may execute the program instructions. Some of the examples of the processor 202 may be a Central Processing Unit (CPU), a Reduced Instruction Set Computer (RISC) processor, an ASIC processor, a Complex Instruction Set Computer (CISC) processor, a Graphical Processing Unit (GPU), a co-processor, and/or a combination thereof.

The memory 204 may include suitable logic, circuitry, and/or interfaces that may be configured to store program instructions executable by the processor 202. In certain embodiments, the memory 204 may be configured to store source code data 112, the updated source code data, the AST data, the revised AST data. In certain embodiments, the memory 204 may be configured to store the trained language model 106. The memory 204 may include computer-readable storage media for carrying or having computer-executable instructions or data structures stored thereon. Such computer-readable storage media may include any available media that may be accessed by a general-purpose or special-purpose computer, such as the processor 202.

By way of example, and not limitation, such computer-readable storage media may include tangible or non-transitory computer-readable storage media, including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 202 to perform a certain operation or group of operations associated with the system 102.

The persistent data storage 206 may include suitable logic, circuitry, and/or interfaces that may be configured to store program instructions executable by the processor 202. The persistent data storage 206 may include computer-readable storage media for carrying or having computer-executable instructions or data structures stored thereon. Such computer-readable storage media may include any available media that may be accessed by a general-purpose or special-purpose computer, such as the processor 202.

By way of example, and not limitation, such computer-readable storage media may include tangible or non-transitory computer-readable storage media including optical disk storage, magnetic disk storage or other magnetic storage devices (e.g., Hard-Disk Drive (HDD)), flash memory devices (e.g., Solid State Drive (SSD), Secure Digital (SD) card, other solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 202 to perform a certain operation or group of operations associated with the system 102.

The I/O device 208 may include suitable logic, circuitry, interfaces, and/or code that may be configured to receive one or more user inputs. The I/O device 208 may be further configured to provide an output in response to the one or more user inputs. The I/O device 208 may include various input and output devices, which may be configured to communicate with the processor 202 and other components, such as the network interface 210. Examples of the input devices may include, but are not limited to, a touch screen, a keyboard, a mouse, a joystick, and/or a microphone. Examples of the output devices may include, but are not limited to, a display device and a speaker.

The network interface 210 may include suitable logic, circuitry, interfaces, and/or code that may be configured to establish a communication among the system 102, the one or more data sources 104, the language model 106, and the user device 108 via the communication network 110. The network interface 210 may be implemented by use of various known technologies to support wired or wireless communication of the system 102, via the communication network 110. The network interface 210 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, and/or a local buffer.

The network interface 210 may communicate via wireless communication with networks, such as the Internet, an Intranet, and/or a wireless network, such as a cellular telephone network, a wireless local area network (LAN) and/or a metropolitan area network (MAN). The wireless communication may use any of a plurality of communication standards, protocols and technologies, such as Global System for Mobile Communications (GSM), Enhanced Data GSM Environment (EDGE), wideband code division multiple access (W-CDMA), Long Term Evolution (LTE), code division multiple access (CDMA), time division multiple access (TDMA), Bluetooth, Wireless Fidelity (Wi-Fi) (such as IEEE 802.11a, IEEE 802.11b, IEEE 802.11g and/or IEEE 802.11n), voice over Internet Protocol (VoIP), light fidelity (Li-Fi), or Wi-MAX.

The functions or operations executed by the system 102, as described in FIG. 1, may be performed by the processor 202. Operations executed by the processor 202 are described in detail, for example, in FIG. 3, FIG. 4, FIG. 5, FIG. 6, FIG. 7, FIG. 8 FIG. 9, and FIG. 10.

Figure 3:
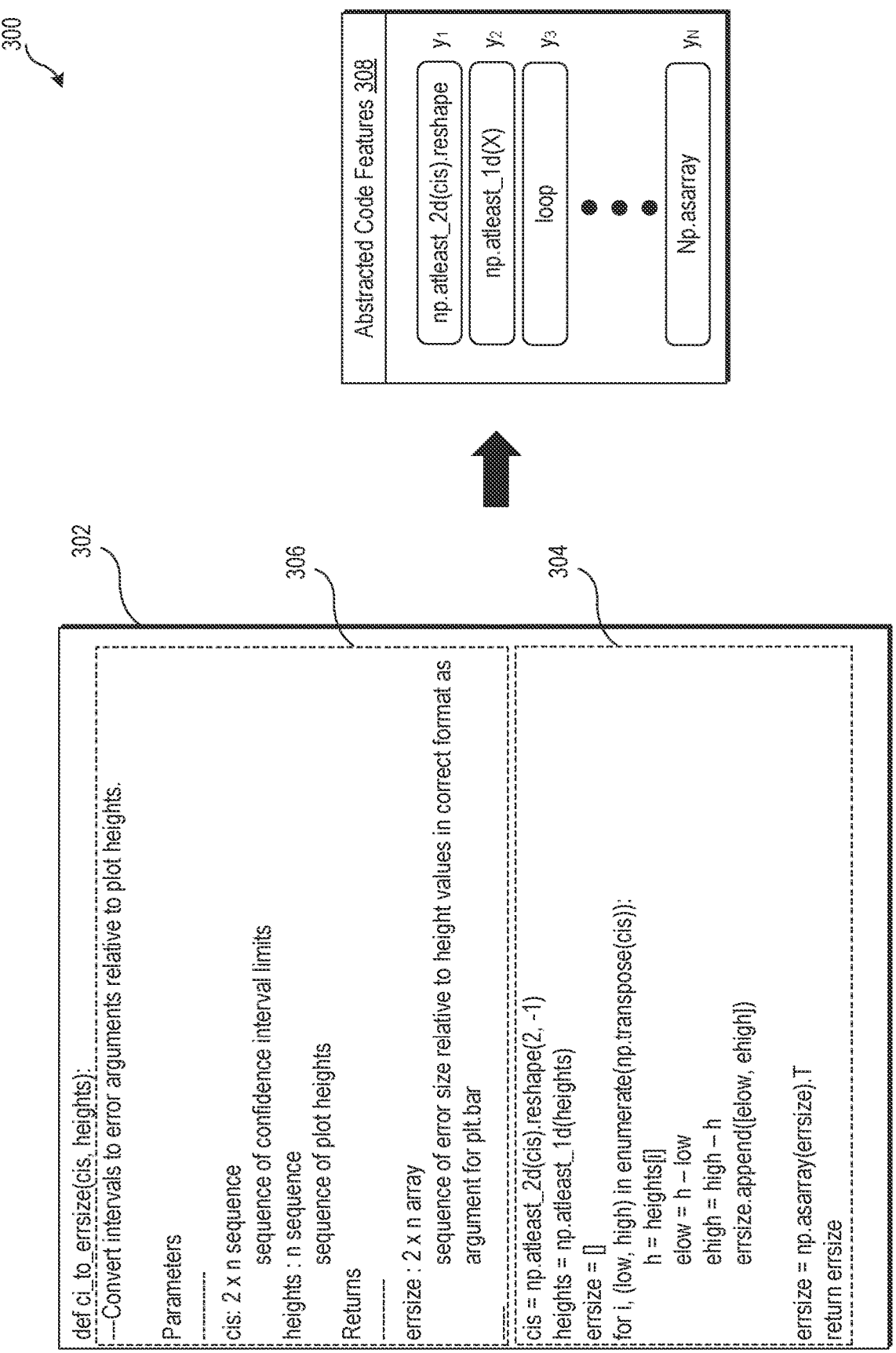
FIG. 3 is a diagram that depicts an exemplary source code data for code enrichment for training language models on tasks related to computer programming.

FIG. 3 is a diagram that depicts an exemplary source code data for code enrichment for training language models on tasks related to computer programming, according to at least one embodiment described in the present disclosure. FIG. 3 is explained in conjunction with elements from FIG. 1 and FIG. 2. With reference to FIG. 3, there is shown a diagram 300. The diagram 300 includes a file of source code data 302 and abstracted code features 308 (also referred to as Foundation of Block of Code (FBloC)) generated based on the source code data 302.

As shown, for example, the source code data 302 includes the computer-executable code 304 and the natural language (NL) text 306. The NL text 306 may be associated with the computer-executable code 304. The computer-executable code 304 may be written in a particular programming language, such as, but not limited to, Python, C, C++, C#, Swift, JavaScript, Go, Java®, or R. The computer-executable code 304 of FIG. 3 is written in Python.

The NL text 306 may correspond to a description of the computer-executable code 304. In an embodiment, the NL text 306 may correspond to one or more comments associated with the computer-executable code 304. In another embodiment, the NL text 306 may correspond to a docstring that may be associated with the computer-executable code 304. In an embodiment, the NL text 306 may be included between lines or inside blocks (e.g., functions or classes) of the computer-executable code 304 and may describe the computer-executable code 304 or a component of the computer-executable code 304. By way of example and not limitation, the NL text for a function "ci_to_errsize( )" that converts intervals to error arguments may be "Convert interval to error arguments relative to plot heights."

With reference to FIG. 3, there are further shown abstracted code features 308 that may be generated based on the source code data 302. The abstracted code features 308 may include a first abstracted code feature $(y_1)$ 308A, a second abstracted code feature $(y_2)$ 308B, a third abstracted code feature $(y_3)$ 308C, and an Nth abstracted code feature $(y_N)$ 308N. Specifically, the system 102 may be configured to transform X to Y, where X=(D,f,A) and Y=$(y_1, y_2, y_3, \ldots, y_N)$. "f" may correspond to a name of a function associated with a corresponding bloc of code, "A" may correspond to a list of parameters associated with the function, and "D" may correspond to an NL text associated with the function. The abstracted code features 308 may be referred as Foundations of Block of Code (FBloC). With reference to FIG. 3, the foundation (or core) components of the received computer executable code include "np.atleast_2d(cis).reshape", "np.atleast_1d(X)", a "loop", and "np.asarray". More details about the abstracted source code features are provided for example, in FIG. 4.

Figure 4:
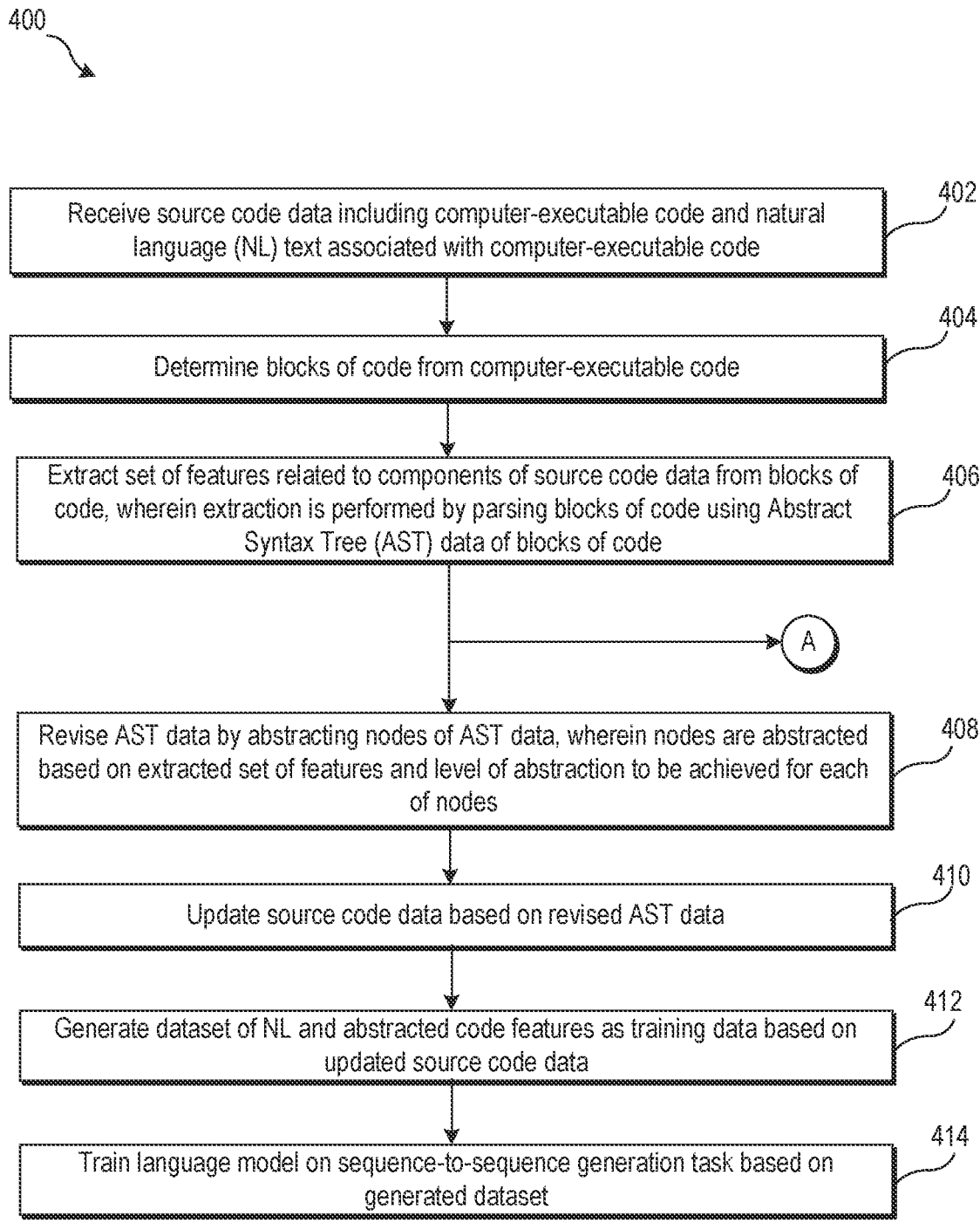
FIG. 4 illustrates a flowchart of an exemplary method for code enrichment for training language models on tasks related to computer programming.

FIG. 4 illustrates a flowchart of an exemplary method for code enrichment for training language models on tasks related to computer programming, according to at least one embodiment described in the present disclosure. FIG. 4 is explained in conjunction with elements from FIG. 1, FIG. 2, and FIG. 3. With reference to FIG. 4, there is shown a flowchart 400. The method illustrated in the flowchart 400 may start at 402 and may be performed by any suitable system, apparatus, or device, such as by the system 102 of FIG. 1 or FIG. 2.

At 402, the source code data 302 may be received from the one or more data sources 104. For example, the source code data 302 may be received from the user device 108 or a web-based source, such as a source code repository. The source code data 302 may include the computer-executable code 304 and the NL text 306 associated with the computer-executable code 304. An example page of the source code data 302 is shown in FIG. 3.

At 404, the blocks of code may be determined from the computer-executable code 304 included in the source code data 302. The blocks of code may include at least one of, but not limited to, a class, a function (or a method), a nested block of lines of code, a single line of code, or a loop from the computer-executable code 304. In an embodiment, the nested block of lines of code may be separated by a newline escape sequence (\n).

In an embodiment, before the determination of the blocks of code, the system 102 may be configured to determine a structure of the computer-executable code 304 included in the received source code data 302. For example, the system 102 may follow a top-down approach to determine a complexity of the computer-executable code 304. Specifically, the system 102 may be configured to import one or more libraries used in the computer-executable code 304. After importing the one or more libraries, instances of one or more classes and one or more functions of the each of the one or more classes may be determined. Based on the determination of the one or more functions, the system 102 may be configured to determine package metadata, a list of classes and a list of functions used in the computer-executable code. The system 102 may be further configured to determine the blocks of code further based on the package metadata, the list of classes, and the list of functions.

At 406, the set of features related to components of the source code data 302 from the blocks of code may be extracted. To extract the set of features, the system 102 may be configured to generate abstract syntax tree (AST) data of the blocks of code. The AST data may include at least one tree representation of the abstract syntactic structure of blocks of code written in a particular programming language. Each node of the tree may denote a construct that may occur in the blocks of code. Specifically, the system 102 may be configured to generate the AST data for each blocks of code.

In an embodiment, the extraction of the set of features may be performed by parsing the blocks of code using AST data of the blocks of code. The extracted set of features may be associated with the functions and the classes of the source code data 302, a set of methods associated with the source code data 302, a set of arguments associated with the source code data 302, a list of classes associated with the source code data 302, and objects associated with the source code data 302. The extracted set of features may include at least one comment for each function and class of the received source code data 302. The set of features may also include a set of name conversions associated with the set of methods, a set of pseudo names associated with the set of arguments, a dictionary associated with the list of classes, and object identifiers associated with the objects. Details about the extraction of the set of features are provided, for example, in FIGS. 5, 6, 7, and 8.

At 408, the AST data may be revised. The AST data may be revised by abstracting nodes of the AST data. The nodes may be abstracted based on the extracted set of features and a level of abstraction to be achieved for each of the nodes of the AST data. In an embodiment, the abstraction of the nodes of the AST data may be performed by iteratively selecting a node of the AST data and determining a type of the selected node. Based on the type of the node and an abstract grammar for the programming language (e.g., Python) used in the source code data 302, the level of abstraction may be selected. Attributes of the selected node may be filtered based on the selected level of abstraction. Details about the revision of the AST data are provided, for example, in FIG. 9.

At 410, the source code data 302 may be updated based on the revised AST data. To update the source code data 302, the system 102 may be configured to compare the AST data of the blocks of code with the revised AST data, based on matching criteria. The matching criteria aims to generalize the source code data 302.

The system 102 may determine a set of changes that may be applicable to portions of the received source code data 302, based on the comparison. The source code data 302 may be updated based on the set of changes. Details about the update of the source code data 302 are provided, for example, in FIG. 9.

At 412, the dataset of NL and abstracted code features may be generated as training data, based on the updated source code data 302. In an embodiment, the NL features may be extracted from the natural language (NL) text 306 associated with the computer-executable code 304 and the abstracted code features may be generated from the computer-executable code 304. In accordance with an embodiment, the abstracted code features 308 may be referred as foundation blocks of code. The details about the generation of the dataset are provided in FIG. 10.

At 414, the language model 106 may be trained on a sequence-to-sequence generation task based on the generated dataset. The sequence-to-sequence generation task may be one of a code synthesis task, a code generation task, a code enrichment task, a code cloning task, or a code retrieval task. The language model may be trained to generate one or more lines of computer-executable code for a natural language query as an input to the language model. In an embodiment, the language model may be implemented using Deep Neural Network(s) that use an encoder-decoder architecture. In a pre-trained language model exists, the system 102 may fine-tune the pre-trained language model based on the generated dataset. In fine-tuning, examples of the training dataset may be used to update parameters such as weights of the pre-trained language model.

Control may pass to end. Although the flowchart 400 is illustrated as discrete operations, such as 402, 404, 406, 408, 410, 412, and 414. However, in certain embodiments, such discrete operations may be further divided into additional operations, combined into fewer operations, or eliminated, depending on the particular implementation without detracting from the essence of the disclosed embodiments.

Figure 5:
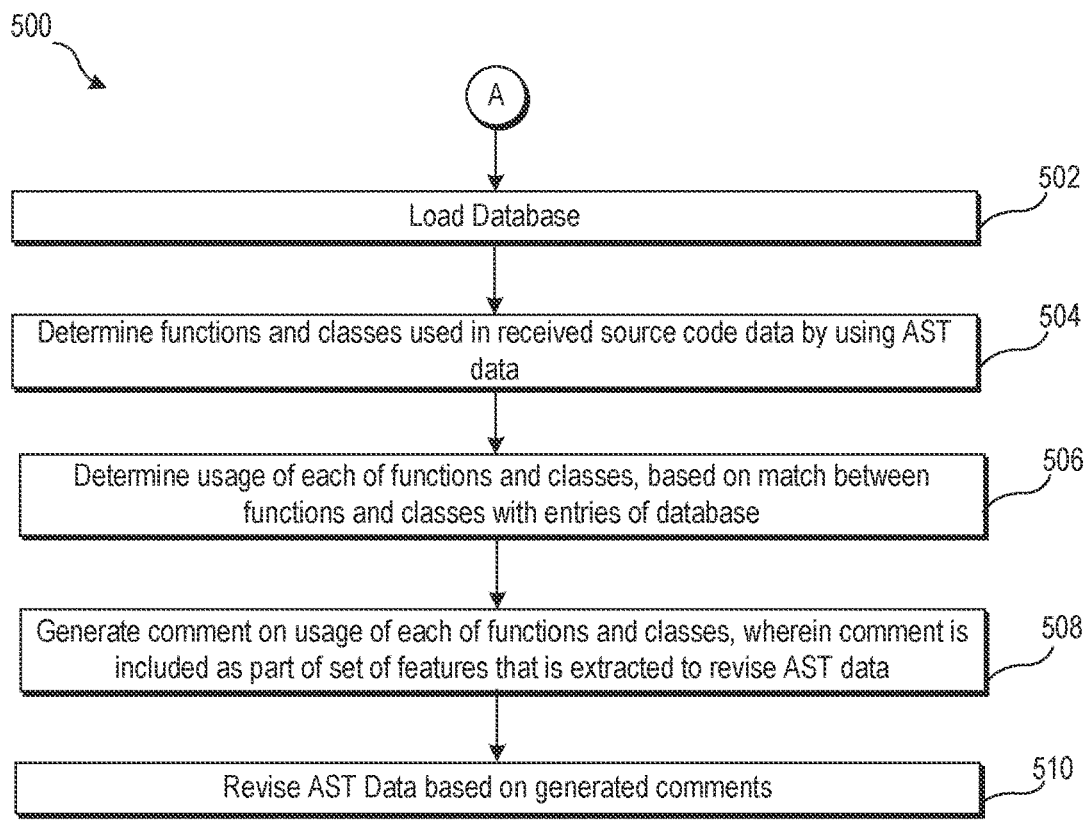
FIG. 5 illustrates a flowchart of an exemplary method for extraction of a first part of the set of features for revision of AST data.

FIG. 5 illustrates a flowchart of an exemplary method for extraction of a first part of a set of features for revision of AST data, according to at least one embodiment described in the present disclosure. FIG. 5 is explained in conjunction with elements from FIG. 1, FIG. 2, FIG. 3, and FIG. 4. With reference to FIG. 5, there is shown a flowchart 500. The method illustrated in the flowchart 500 may start at 502 and may be performed by any suitable system, apparatus, or device, such as by the system 102 of FIG. 1 or FIG. 2.

At 502, a database may be loaded into the memory 204. The system 102 may be configured to load the database into the memory 204 based on the determination of the blocks of code. The database may include package metadata associated with source codes of a plurality of code packages. Such packages may be identified by parsing the AST data associated with the blocks of code. The plurality of code packages may be included in the computer-executable code 304. Each of the plurality of code packages may correspond to a module that may be added to the computer-executable code 304 to incorporate additional options, features, or functionalities that may be provided by the corresponding code package.

In an embodiment, the package metadata may include, but not limited to, a description of the corresponding code package, a name of the corresponding code package, a short description of the corresponding code package, a classifier of the corresponding code package, and a name of one or more modules included in the corresponding code package. In an embodiment, the database may further include a set of classes that may be used in the source codes of the plurality of code packages, a set of subclasses that may be used in the source codes, a set of functions that may be used in the source codes, and natural language texts that may be used in the source codes. Natural language texts in the source codes may include, for example, a docstring associated with the corresponding source codes, a comment associated with the corresponding source codes, and the like.

At 504, functions and classes may be determined. The system 102 may be configured to determine functions and classes that may be used in the received source code data 302. To determine the functions and classes, the system 102 may use the AST data. In an embodiment, the classes used in the received source code may include one or more nested classes that may be used in the received source code. By way of example, and not limitation, the received source code data 302 may be given as follows:

```
def main(args):
    utils.init_distributed_mode(args)
    print("git:\n { }\n".Format(utils.get_sha( )))
    if args.frozen_weights is not None:
        assert args. masks, "Frozen training is meant for segmentation only"
    print(args)
    device = torch.device(args.device)
    #fix the seed for reproducibility
    seed = args. Seed + utils.get_rank( )
    torch.manual_seed(seed)
    np.random.seed (seed)
    random.seed(seed)
    model, criterion, postprocessors = build_model(args)
    model.to(device)
```
Corresponding to the received source code data 302, the functions may include, for example, "print("git:\n {}\n".Format(utils.get_sha( )))", "print(args)", "torch.device(args.device)", "torch.manual_seed(seed)", "np.random.seed (seed)", and "random. Seed(seed)".

At 506, a usage of each of the functions and the classes may be determined. The system 102 may be configured to determine the usage of each of the functions and the classes. In an embodiment, the usage of each of the functions and the classes may be determined based on a match between the functions and the classes with entries of the database. In an embodiment, the usage of each function or class may correspond to an objective of each function or class in the received source code data 302. By way of example, and not limitation, if the function is "np.random.seed(seed)", then the usage of the function may be to initialize a seed value for a random number generator in NumPy®. In an embodiment, the system 102 may be further configured to add the function and classes into a function usage stack.

At 508, a comment may be generated for the determined usage. The system 102 may be configured to generate a comment on the usage of each of the functions and the classes. In an embodiment, the system 102 may be configured to generate the comment on the usage of each of the functions and the classes added in the function usage stack. The generated comment may be a natural language text that may describe the use of a corresponding function or class. The comment may be included as a first part of a set of features that may be extracted to revise the AST data (as described below). By way of example, and not limitation, if an object of a first function in function usage stack is to add two integers, then the generated comment corresponding to the first function may be "Function to add two integers" or "Function to add integer A and integer B". It may be noted that the comment may be generated for each of the functions and the classes.

At 510, the AST data of the blocks of code may be revised. The system 102 may be further configured to revise the AST data by abstracting nodes of the AST data. The nodes of the AST data may be abstracted based on the generated comments and a level of abstraction to be achieved for each of the nodes. The system 102 further update the source code data 302 based on the revised AST data. The system 102 may further generate a dataset of NL and abstracted code features as training data based on the updated source code data 302 and further train the language model on the sequence-to-sequence generation task based on the generated dataset. Details about the generation of the dataset and training of the language model are provided, for example, in FIG. 10.

Control may pass to end. Although the flowchart 500 is illustrated as discrete operations, such as 502, 504, 506, 508, and 510. However, in certain embodiments, such discrete operations may be further divided into additional operations, combined into fewer operations, or eliminated, depending on the particular implementation without detracting from the essence of the disclosed embodiments.

Figure 6:
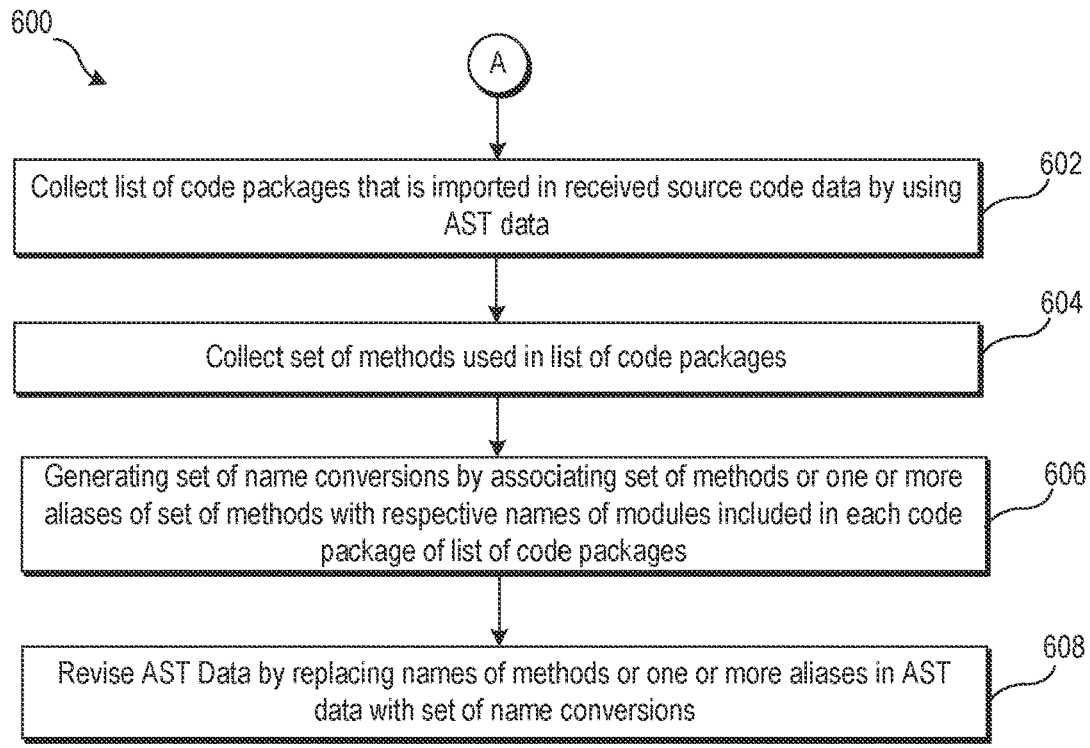
FIG. 6 illustrates a flowchart of an exemplary method for extraction of a second part of the set of features for revision of AST data.

FIG. 6 illustrates a flowchart of an exemplary method for extraction of a second part of a set of features for revision of AST data, according to at least one embodiment described in the present disclosure. FIG. 6 is explained in conjunction with elements from FIG. 1, FIG. 2, FIG. 3, FIG. 4, and FIG. 5. With reference to FIG. 6, there is shown a flowchart 600. The method illustrated in the flowchart 600 may start at 602 and may be performed by any suitable system, apparatus, or device, such as by the system 102 of FIG. 1 or FIG. 2.

At 602, a list of code packages may be collected. The system 102 may be configured to collect the list of code packages. Such packages may be imported in the received source data 302 using statements, such 'import package A'. The list of code packages may be collected by using the AST data. As discussed, each code package may include one or more modules, a set of methods, and one or more aliases for the set of methods. Details about the collection of the list of code packages are provided, for example, in FIG. 5.

At 604, a set of methods may be collected from the AST data associated with the blocks of code. The system 102 may be configured to collect the set of methods used in the list of code packages.

At 606, a set of name conversions may be generated. The system 102 may be configured to generate the set of name conversations by associating the set of methods or the one or more aliases of the set of methods with respective names of modules that may be included in each code package of the list of code packages. The list of name conversions may be included in the extracted set of features. For example, the system 102 may be configured to associate the set of methods or the one or more aliases with module.method. In an embodiment, the system 102 may be configured to determine whether an alias is present for each module included in the source code data 302. Based on the determination, the system 102 may be configured to replace node.id in the AST with module.method. Examples of such association are provided below.

At 608, the AST data of the blocks of code may be revised. The system 102 may be configured to revise the AST data by replacing the names of the methods or the one or more aliases in the AST data with the set of name conversions. An example portion of the received source code data 302 may be given as follows:

```
import abc
import sys
import stat as st
from __collections_abc import __check_methods
__names = sys.builtin_module_names
# Note: more names are added to all later.
__all__ = ["altsep", "curdir", "pardir", "sep", "pathsep", "linesep", "defpath", "name",
"path", "devnull", "SEEK_SET", "SEEK_CUR", "SEEK_END", "fsencode", "fsdecode",
"get_exec_path", "fdopen", "popen", "extsep"]
def _exists(name):
    return name in globals( )
```

For the received source code data 302, the revised AST data may be updated based on following changes (i.e., name conversions):

```
{'abc': 'import.abc', 'sys': 'import.sys', 'st': 'import.stat', '__check_methods':
'import.__collections_abc.__check_methods', 'curdir': 'import.os.path.curdir', 'pardir':
'import.os. path. pardir', 'sep': 'import.os.path.sep', 'pathsep':
'import.os.path.pathsep', 'defpath': 'import.os.path.defpath', 'extsep':
'import.os.path.extsep', 'altsep': 'import.os.path.altsep', 'devnull':
'import.os.path.devnull', 'MutableMapping':
'import.__collections_abc.MutableMapping'}.
```

With reference to the aforementioned example, the system 102 may be revise a node corresponding to "abc" in the AST data using a new node that may correspond to "import.abc". Similarly, the node corresponding to "sys" may be revised using a new node that may correspond to "import.sys".

The system 102 may be further configured to revise the AST data by abstracting nodes of the AST data. The nodes of the AST data may be abstracted based on the generated set of name conversions and a level of abstraction to be achieved for each of the nodes. The system 102 further update the source code data 302 based on the revised AST data. The system 102 may further generate a dataset of NL and abstracted code features as training data based on the updated source code data 302 and may train a language model on a sequence-to-sequence generation task based on the generated dataset. Details about the generation of the dataset and training of the language model are provided, for example, in FIG. 10.

Control may pass to end. Although the flowchart 600 is illustrated as discrete operations, such as 602, 604, 606, and 608. However, in certain embodiments, such discrete operations may be further divided into additional operations, combined into fewer operations, or eliminated, depending on the particular implementation without detracting from the essence of the disclosed embodiments.

Figure 7:
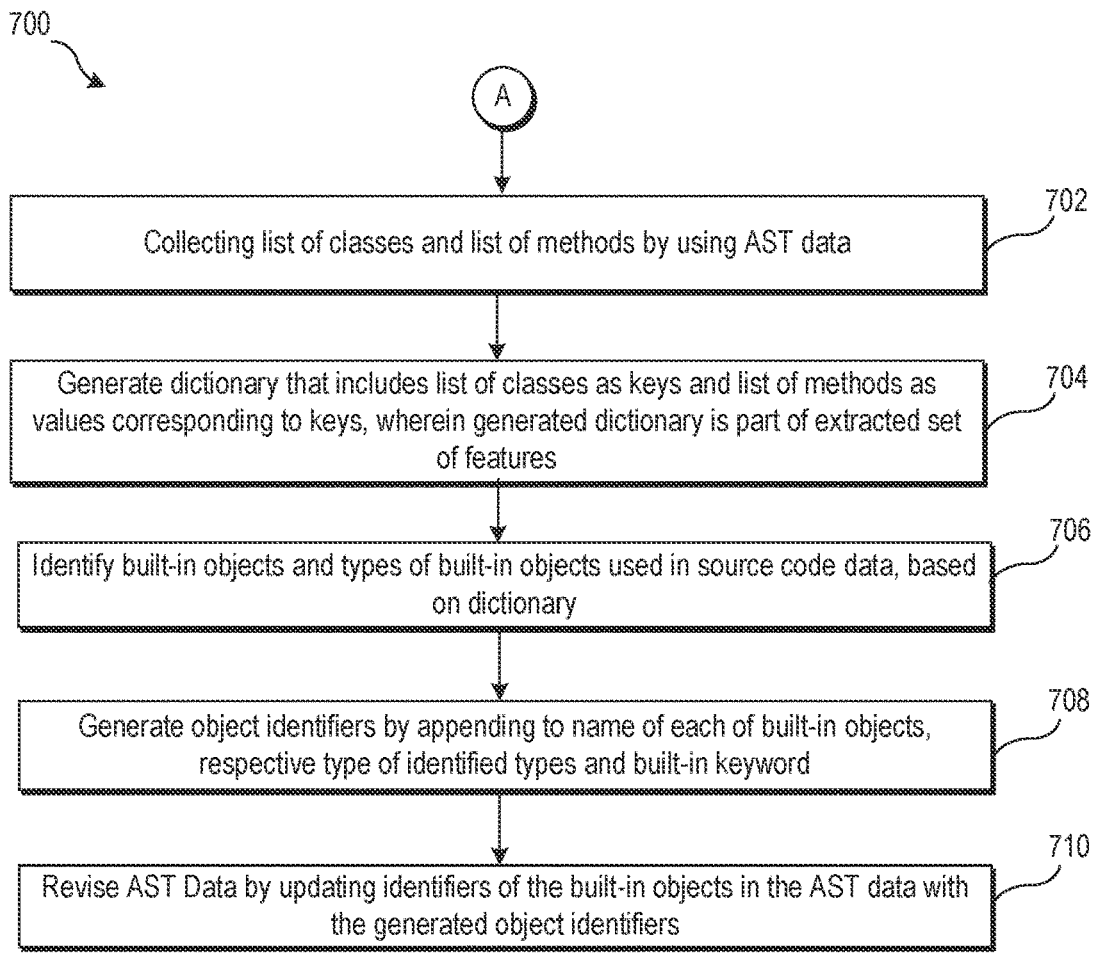
FIG. 7 illustrates a flowchart of an exemplary method for extraction of a third part of the set of features for revision of AST data.

FIG. 7 illustrates a flowchart of an exemplary method for extraction of a third part of a set of features for revision of AST data, according to at least one embodiment described in the present disclosure. FIG. 7 is explained in conjunction with elements from FIG. 1, FIG. 2, FIG. 3, FIG. 4, FIG. 5, and FIG. 6. With reference to FIG. 7, there is shown a flowchart 700. The method illustrated in the flowchart 700 may start at 702 and may be performed by any suitable system, apparatus, or device, such as by the system 102 of FIG. 1 or FIG. 2.

At 702, a list of classes and a list of methods may be collected. The system 102 may be configured to collect the list of classes and the list of methods associated with the source code data 302, by using the AST data. Specifically, the system 102 may be configured to collect each of the list of classes and the list of methods included in the source code data 302 based on the AST data associated with the blocks of code.

At 704, a dictionary may be generated. The system 102 may be configured to generate the dictionary based on the collected list of classes and the collected list of methods. The generated dictionary may include the list of classes as keys and the list of methods as values corresponding to the keys. The dictionary may be included as a third part of the extracted set of features.

At 706, built-in objects may be identified. The system 102 may be configured to identify built-in objects and types of built-in objects that may be used in the source code data. In an embodiment, the built-in objects and the types of built-in objects may be identified based on the generated dictionary. In an embodiment, the built-in objects may correspond to built-in functions (or methods). The type of built-in functions may be different tin different programming languages. The type of the built-in objects may correspond to a datatype of the built-in objects and information about the type pf the built-in objects may provide additional information for training the language model.

At 708, object identifiers may be generated. The system 102 may be configured to generate the object identifiers by appending to a name of each of the built-in objects, a respective type of the identified types and a built-in keyword. In an embodiment, the built-in keyword may correspond to an identifier (id) of the corresponding built-in object. The object identifiers may be a third part of the set of features that may be extracted to revise the AST data. In an embodiment, each object identifier may be in a specific format such as "Obj→"builtins.<type>.<func/method/

Figure 8:
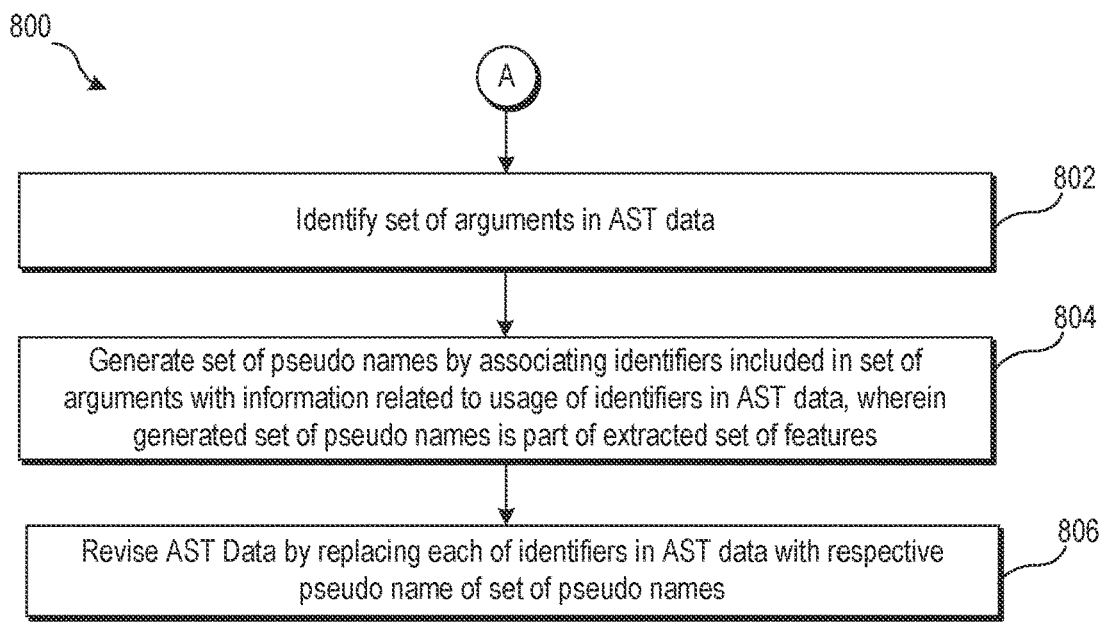
FIG. 8 illustrates a flowchart of an exemplary method for extraction of a fourth part of the set of features for revision of AST data.

FIG. 8 illustrates a flowchart of an exemplary method for extraction of a fourth part of a set of features for revision of AST data, according to at least one embodiment described in the present disclosure. FIG. 8 is explained in conjunction with elements from FIG. 1, FIG. 2, FIG. 3, FIG. 4, FIG. 5, FIG. 6, and FIG. 7. With reference to FIG. 8, there is shown a flowchart 800. The method illustrated in the flowchart 800 may start at 802 and may be performed by any suitable system, apparatus, or device, such as by the system 102 of FIG. 1 or FIG. 2.

At 802, a set of arguments may be identified. The system 102 may be configured to identify set of arguments in the AST data. By way of example, and not limitation, the received source code data may be given as follows:

```
def __fspath(path):
    """Return the path representation of a path-like object.
    If str or bytes is passed in, it is returned unchanged. Otherwise the
    os.PathLike interface is used to get the path representation. If the
    path representation is not str or bytes, TypeError is raised. If the
    provided path is not str, bytes, or os.PathLike, TypeError is raised.
    """
    if isinstance(path, (str, bytes)):
        return path
    # Work from the object's type to match method resolution of other magic
    # methods.
    path_type = type(path)
    try:
        path_repr = path_type.__fspath__(path)
    except AttributeError:
        if hasattr(path_type, '__fspath__'):
            raise
        else:
            raise TypeError("expected str, bytes or os.PathLike object,"
                "not" + path_type.__name__)
    if isinstance(path_repr, (str, bytes)):
        return path_repr
    else:
        raise TypeError("expected { }.__fspath__( ) to return str or bytes,"
            "not { }".format(path_type.__name__,
                type(path_repr).__name__))
# If there is no C implementation, make the pure Python version the
# implementation as transparently as possible.
if not _exists('fspath'):
    fspath = __fspath
    fspath.__name__ = "fspath"
``` obj>". Here "type" may correspond to a datatype of the built-in function, and "fucn/method/obj" may correspond to a name of the built-in function or an object of the built-in function.

At 710, the AST data may be revised. In an embodiment, the system 102 may be configured to revise the AST data. The AST data may be revised by updating identifiers of the built-in objects in the AST data with the generated object identifiers. The system 102 further update the source code data based on the revised AST data. The updated source code data may be used to generate a dataset of NL and abstracted code features as training data. The language model may be on the sequence-to-sequence generation task based on the generated dataset. Details about the generation of the dataset and training of the language model are provided, for example, in FIG. 10.

Control may pass to end. Although the flowchart 700 is illustrated as discrete operations, such as 702, 704, 706, 708, and 710. However, in certain embodiments, such discrete operations may be further divided into additional operations, combined into fewer operations, or eliminated, depending on the particular implementation without detracting from the essence of the disclosed embodiments.

From the aforementioned example of the received source code data, the set of arguments may be identified to be "path".

At 804, a set of pseudo names may be generated. The system 102 may be configured to generate the set of pseudo names by associating identifiers included in the set of arguments with information related to a usage of the identifiers in the AST data. The generated set of pseudo names may be a part of the extracted set of features. In an embodiment, the set of pseudo names may correspond to a fourth set of features of the extracted set of features. For example, the pseudo name of the "path" argument may be "func._fspath.arg.path".

At 806, the AST data of the blocks of code may be revised. The system 102 may be configured to revise the AST data by replacing each of the identifiers in the AST data with a respective pseudo name of the set of pseudo names. For example, the "path" argument in the AST data may be revised as "func._fspath.arg.path".

The system 102 update the source code data based on the revised AST data and may generate a dataset of NL and abstracted code features as training data based on the updated source code data. The language model may be trained on a sequence-to-sequence generation task based on the generated dataset. Details about the generation of the dataset and training of the language model are provided, for example, in FIG. 10.

Control may pass to end. Although the flowchart 800 is illustrated as discrete operations, such as 802, 804, and 806. However, in certain embodiments, such discrete operations may be further divided into additional operations, combined into fewer operations, or eliminated, depending on the particular implementation without detracting from the essence of the disclosed embodiments.

Figure 9:
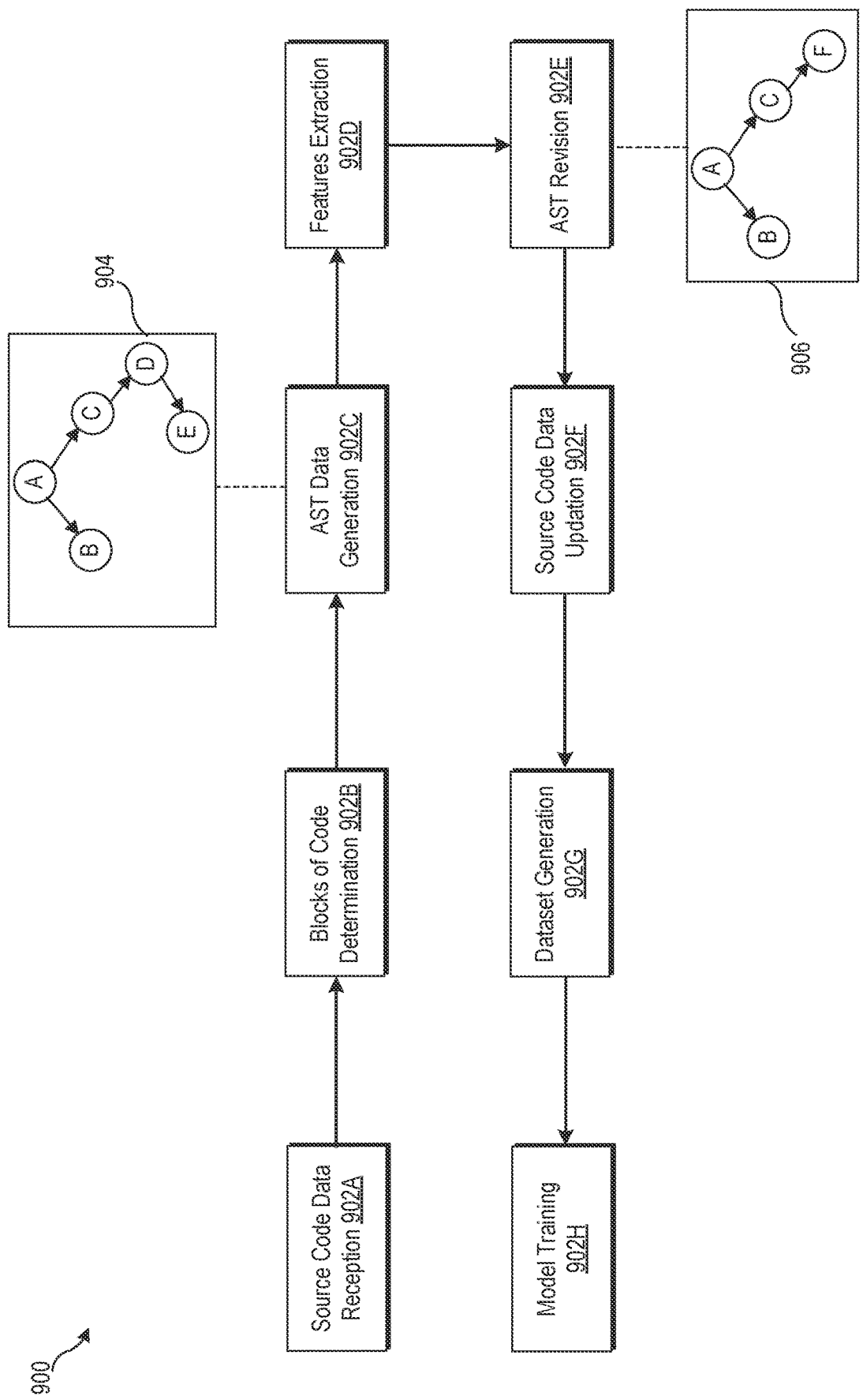
FIG. 9 is diagram that illustrates exemplary operations for code enrichment for training language models on tasks related to computer programming.

FIG. 9 is diagram that illustrates exemplary operations for code enrichment for training language models on tasks related to computer programming, in accordance with an embodiment of the disclosure. FIG. 9 is explained in conjunction with elements from FIG. 1, FIG. 2, FIG. 3, FIG. 4, FIG. 5, FIG. 6, FIG. 7, and FIG. 8. With reference to FIG. 9, there is shown a block diagram 900 that illustrates exemplary operations from 902A to 902H, as described herein. The exemplary operations illustrated in the block diagram 900 may start at 902A and may be performed by any computing system, apparatus, or device, such as by the system 102 of FIG. 1 or the processor 202 of FIG. 2. Although illustrated with discrete blocks, the exemplary operations associated with one or more blocks of the block diagram 900 may be divided into additional blocks, combined into fewer blocks, or eliminated, depending on the particular implementation.

At 902A, source code data may be received from the one or more data sources 104. The source code data may include a computer-executable code and a NL text associated with the computer-executable code. By way of a first example, and not limitation, the received source code data may include a piece of code which is given as follows:

```
try:
    path_repr = path_type.__fspath__(path)
except AttributeError:
    if hasattr(path_type, '__fspath__'):
        raise
    else:
        raise TypeError("expected str, bytes or os. PathLike
            "not" + path_type.__name__)
```

At 902B, blocks of code may be determined from the source code data. The blocks of code may include at least one of a class, a function, a nested block of lines of code, a single line of code, or a loop. Details about the determination of the blocks of code are provided in FIG. 4.

At 902C, an AST data of the determined blocks of code may be generated. As discussed, the AST data may include an AST 904 that may include a tree representation of the abstract syntactic structure of source code. Each node of the tree denotes a construct occurring in the determined blocks of code. By way of a second example, and not limitation, the AST 904 may include five nodes such as "A", "B", "C", "D", and "E".

At 902D, a set of features may be extracted. The extracted set of features may be related to the components of the source code data from the blocks of code. The extracted set of features may be associated with the functions and the classes of the source code data 302, a set of methods associated with the source code data 302, a set of arguments associated with the source code data 302, a list of classes associated with the source code data 302, and objects associated with the source code data 302. The extracted set of features may include at least one comment for each function and class of the received source code data 302. The set of features may also include a set of name conversions associated with the set of methods, a set of pseudo names associated with the set of arguments, a dictionary associated with the list of classes, and object identifiers associated with the objects. Details about the extraction of the set of features are provided, for example, in FIGS. 5, 6, 7, and 8.

At 902E, an AST data revision may be performed. In the AST data revision operation, the system 102 may be configured to revise the AST data. Specifically, the system 102 may be configured to revise the AST 904 included in the AST data. The revision may be performed by abstracting nodes of the AST 904 in the AST data. In an embodiment, the abstraction of the node of the AST data may correspond to a removal of the nodes from the AST 904. The abstraction may be performed based on the extracted set of features (as described in FIGS. 5, 6, 7, and 8) and a level of abstraction to be achieved for each of the nodes. The level of abstraction may be associated with a type of grammar associated with the programming language of the source code data 302. An iterative process of abstracting nodes is provided here as an example.

In an embodiment, the system 102 may be configured to abstract of the nodes of the AST data by selecting a node of the AST data. Based on the selection of the node, the system 102 may be configured to determine a type of the selected node. The system 102 may be further configured to select the level of abstraction based on the type of the node and an abstract grammar for a programming language that may be used in the source code data. The system 102 may be configured to filter attributes of the selected node based on the selected level of abstraction.

In another embodiment, the system 102 may be configured to select a node of the AST data. In an embodiment, the AST data may be revised by dropping the selected node from the AST data. In such an embodiment, the dropping may be performed based on a determination that a function call is absent in the selected node.

With reference to the second example, the system 102 may select the node "E" from the AST 904. The system 102 may further determine that the function call is absent in the selected node "E". Based on the determination, the system 102 may be configured to drop the selected node "E" to generate a revised AST 906 that may be included in the revised AST data.

At 902F, source code data may be updated. The system 102 may be configured to update the source code data based on the revised AST data. In an embodiment, the system 102 may be configured to compare the AST data of the blocks of code with the revised AST data based on matching criteria. Each criterion of the matching criteria may aim to transfer AST data to text and/or generalize the source code data by highlighting information associated with the components of the source code. In an embodiment, the matching criteria may be associated with, but not limited to, imported packages name conversions, argument name conversions, built-ins methods/functions/types, function calls, for loop minimization, and return value extraction.

The system 102 may be further configured to determine a set of changes that may be applicable to portions of the received source code data based on the comparison. The system 102 may be further configured to update the source code data updated based on the set of changes. It should be noted that the source code data may be updated based on revised AST data because an abstract of each node may be generated based on the revised AST. The abstract of each node may eventually generate an abstract of the corresponding blocks of data.

At 902G, a dataset generation operation may be performed. In the dataset generation operation, the system 102 may be configured to generate a dataset of NL and abstracted code features as training data. The dataset may be generated based on the updated source code data. With reference to the first example, the abstracted code features may include "Type(Input1)._fspath_(Input1)".

At 902H, a model training operation may be performed. In the model training operation, the system 102 may be configured to train the language model. The language model may be trained on a sequence-to-sequence generation task based on the generated dataset. Details about the language model are provided in FIG. 10.

Figure 10:
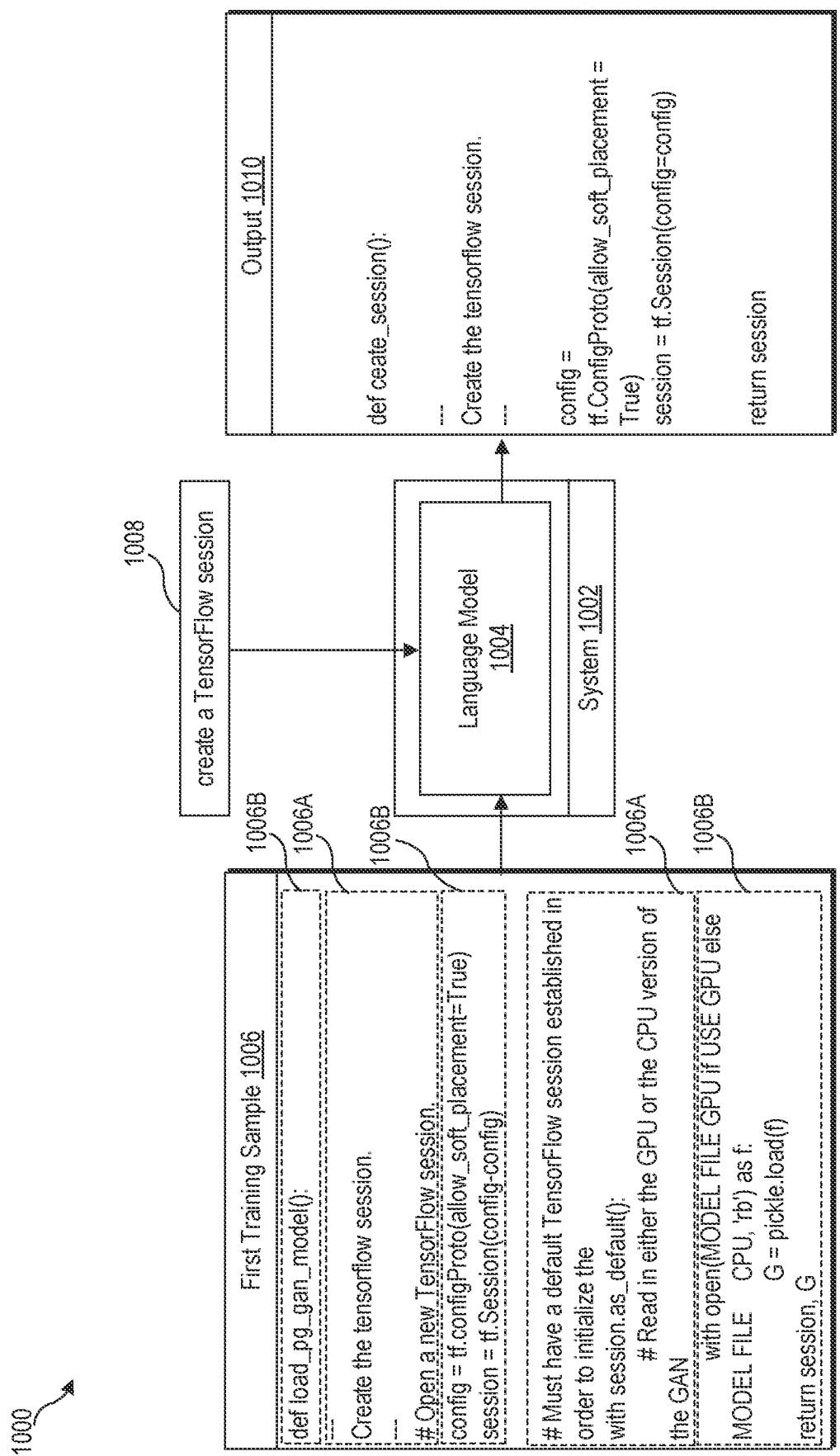
FIG. 10 is a diagram that illustrates an exemplary scenario for application of the language model trained on tasks related to computer programming.

FIG. 10 is a diagram that illustrates an exemplary scenario for application of the language model trained on tasks related to computer programming, in accordance with example embodiments. FIG. 10 is explained in conjunction with elements from FIG. 1, FIG. 2, FIG. 3, FIG. 4, FIG. 5, FIG. 6, FIG. 7, FIG. 8, and FIG. 9. With reference to FIG. 10, there is shown an exemplary scenario 1000. In FIG. 10, there is shown a system 1002 that may include a language model 1004. There is further shown a first training sample 1006 of a plurality of training samples included in the dataset, an input 1008, and an output 1010.

In an embodiment, the system 102 may operate in two phases—a setup phase and a prediction phase. The system 102 may operate in a prediction phase after one or more operations of the setup phase has been executed. In the setup phase, the system 102 may be configured to train the language model 1004. To train the language model, the system 102 may be configured to generate the dataset of NL and abstracted code features as training data based on the updated source code data. The dataset may include a plurality of training samples. Each training sample of the plurality of training samples in the dataset may include an NL feature and a corresponding abstracted code feature. For example, in the first training sample 1006 of the plurality of training samples may include first NL features 1006A, and first abstracted code features 1006B. The language model 1004 may be trained on a sequence-to-sequence generation task based on the generated dataset. The sequence-to-sequence generation task may be one of a code synthesis task, a code generation task, a code enrichment task, a code cloning task, or a code retrieval task.

The language model 1004 may be the deep neural network that may use an encoder-decoder architecture. The language model 1004 may be trained to generate one or more lines of computer-executable code for a natural language query as an input to the language model 1004. In an embodiment, the system 1002 may provide the first NL features 1006A as an input to the encoder network and the first abstracted code features 1006B to the decoder network of the deep neural network during the training language model 1004. The language model 1004 may be trained to reconstruct abstracted code features (such as the first abstracted code features 1006B) from the NL features (such as first NL features 1006A).

In the prediction phase, the system 1002 may be configured to receive the input 1008. The input 1008 may be received from the user 116 via the user device 108 and may include the natural language query. In an embodiment, the natural language query may be "create a TensorFlow session". Based on the received input 1008, the system 1002 may be configured to apply the trained language model 1004 on the received input 1008. The system 1002 may be further configured to apply the language model 1004 on the input 1008 to generate the output 1010. The generated output may include a first computer-executable code that may associated with the natural language query, as shown in FIG. 10, for example.

Various embodiments of the disclosure may provide one or more non-transitory computer-readable storage medium configured to store instructions that, in response to being executed, cause a system (such as the system 102) to perform operations. The operations may include receiving source code data. The source code data may include a computer-executable code and a natural language (NL) text associated with the computer-executable code. The operations may further include determining blocks of code from the computer-executable code. The operations may further include extracting a set of features related to components of the source code data from the blocks of code. The extraction may be performed by parsing the blocks of code using Abstract Syntax Tree (AST) data of the blocks of code. The operations may further include revising the AST data by abstracting nodes of the AST data. The nodes may be abstracted based on the extracted set of features and a level of abstraction to be achieved for each of the nodes. The operations may further include updating the source code data based on the revised AST data. The operations may further include generating a dataset of NL and abstracted code features as training data based on the updated source code data. The operations may further include training a language model (such as the language model 106) on a sequence-to-sequence generation task based on the generated dataset.

As indicated above, the embodiments described in the present disclosure may include the use of a special purpose or general-purpose computer (e.g., the processor 202 of FIG. 2) including various computer hardware or software modules, as discussed in greater detail below. Further, as indicated above, embodiments described in the present disclosure may be implemented using computer-readable media (e.g., the memory 204 or the persistent data storage 206 of FIG. 2) for carrying or having computer-executable instructions or data structures stored thereon.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, or some other hardware) of the computing system. In some embodiments, the different components, modules, engines, and services described in the present disclosure may be implemented as objects or processes that execute on the computing system (e.g., as separate threads). While some of the systems and methods described in the present disclosure are generally described as being implemented in software (stored on and/or executed by general purpose hardware), specific hardware implementations or a combination of software and specific hardware implementations are also possible and contemplated. In this description, a "computing entity" may be any computing system as previously defined in the present disclosure, or any module or combination of modulates running on a computing system.

In accordance with common practice, the various features illustrated in the drawings may not be drawn to scale. The illustrations presented in the present disclosure are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," among others).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms "first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited in the present disclosure are intended for pedagogical objects to aid the reader in understanding the invention and the concepts contributed by the inventor to furthering the art and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. A method, executed by a processor, comprising:
   receiving source code data comprising a computer-executable code and a natural language (NL) text associated with the computer-executable code;
   determining blocks of code from the computer-executable code;
   extracting a set of features related to components of the source code data from the blocks of code, wherein the extraction is performed by parsing the blocks of code using Abstract Syntax Tree (AST) data of the blocks of code;
   revising the AST data by abstracting nodes of the AST data, wherein the nodes are abstracted based on the extracted set of features and a level of abstraction to be achieved for each of the nodes;
   updating the source code data based on the revised AST data;
   generating a dataset of NL and abstracted code features as training data based on the updated source code data; and
   training a language model on a sequence-to-sequence generation task based on the generated dataset.

2. The method according to claim 1, wherein the blocks of code comprise at least one of a class, a function, a nested block of lines of code, a single line of code, or a loop.

3. The method according to claim 1, further comprising:
   loading a database that includes:
      package metadata associated with source codes of a plurality of code packages;
      a set of classes used in the source codes;
      a set of subclasses used in the source codes;
      a set of functions used in the source codes;
      natural language texts used in the source codes;
   determining functions and classes used in the received source code data by using the AST data;
   determining a usage of each of the functions and the classes, based on a match between the functions and the classes with entries of the database; and
   generating a comment on the usage of each of the functions and the classes, wherein the comment is included as a part of the set of features that is extracted to revise the AST data.

4. The method according to claim 1, further comprising:
   collecting a list of code packages that is imported in the received source code data by using the AST data;
   collecting a set of methods used in the list of code packages; and
   generating a set of name conversions by associating the set of methods or one or more aliases of the set of methods with respective names of modules included in each code package of the list of code packages, wherein the set of name conversions is included in the set of features.

5. The method according to claim 4, wherein the AST data is revised further by replacing names of the methods or the one or more aliases in the AST data with the set of name conversions.

6. The method according to claim 1, further comprising:
identifying a set of arguments in the AST data; and
generating a set of pseudo names by associating identifiers included in the set of arguments with information related to a usage of identifiers in the AST data, wherein the generated set of pseudo names is part of the extracted set of features.

7. The method according to claim 6, wherein the AST data is revised further by replacing each of the identifiers in the AST data with a respective pseudo name of the set of pseudo names.

8. The method according to claim 1, wherein the abstraction of the nodes of the AST data is performed by:
selecting a node of the AST data;
determining a type of the selected node;
selecting the level of abstraction based on the type of the node and an abstract grammar for a programming language used in the source code data; and
filtering attributes of the selected node based on the selected level of abstraction.

9. The method according to claim 1, further comprising:
collecting a list of classes and a list of methods by using the AST data; and
generating a dictionary that includes the list of classes as keys and the list of methods as values corresponding to the keys, wherein the generated dictionary is part of the extracted set of features.

10. The method according to claim 9, further comprising:
identifying built-in objects and types of the built-in objects used in the source code data, based on the dictionary; and
generating object identifiers by appending to a name of each of the built-in objects, a respective type of the identified types and a built-in keyword, wherein the AST data is revised further by updating identifiers of the built-in objects in the AST data with the generated object identifiers.

11. The method according to claim 10, wherein the object identifiers are part of the set of features extracted to revise the AST data.

12. The method according to claim 1, further comprising selecting a node of the AST data, wherein the AST data is revised further by dropping the selected node from the AST data, and the dropping is performed based on a determination that a function call is absent in the selected node.

13. The method according to claim 1, further comprising:
comparing the AST data of the blocks of code with the revised AST data, based on matching criteria; and
determining a set of changes applicable to portions of the received source code data, based on the comparison, wherein the source code data is updated based on the set of changes.

14. The method according to claim 1, wherein the language mode is a Deep Neural Network that uses an encoder-decoder architecture, and wherein the language model is trained to generate one or more lines of the computer-executable code for a natural language query as an input to the language model.

15. The method according to claim 1, wherein the sequence-to-sequence generation task is one of a code synthesis task, a code generation task, a code enrichment task, a code cloning task, or a code retrieval task.

16. A non-transitory computer-readable storage medium configured to store instructions that, in response to being executed, causes a system to perform operations, the operations comprising:
receiving source code data comprising a computer-executable code and a natural language (NL) text associated with the computer-executable code;
determining blocks of code from the computer-executable code;
extracting a set of features related to components of the source code data from the blocks of code, wherein the extraction is performed by parsing the blocks of code using Abstract Syntax Tree (AST) data of the blocks of code;
revising the AST data by abstracting nodes of the AST data, wherein the nodes are abstracted based on the extracted set of features and a level of abstraction to be achieved for each of the nodes;
updating the source code data based on the revised AST data;
generating a dataset of NL and abstracted code features as training data based on the updated source code data; and
training a language model on a sequence-to-sequence generation task based on the generated dataset.

17. The non-transitory computer-readable storage medium according to claim 16, wherein the blocks of code comprise at least one of a class, a function, a nested block of lines of code, a single line of code, or a loop.

18. The non-transitory computer-readable storage medium according to claim 16, wherein the language mode is a Deep Neural Network that uses an encoder-decoder architecture, and wherein the language model is trained to generate one or more lines of the computer-executable code for a natural language query as an input to the language model.

19. The non-transitory computer-readable storage medium according to claim 16, wherein the sequence-to-sequence generation task is one of a code synthesis task, a code generation task, a code enrichment task, a code cloning task, or a code retrieval task.

20. A system, comprising:
a processor configured to:
receive source code data comprising a computer-executable code and a natural language (NL) text associated with the computer-executable code;
determine blocks of code from the computer-executable code;
extract a set of features related to components of the source code data from the blocks of code, wherein the extraction is performed by parsing the blocks of code using Abstract Syntax Tree (AST) data of the blocks of code;
revise the AST data by abstracting nodes of the AST data, wherein the nodes are abstracted based on the extracted set of features and a level of abstraction to be achieved for each of the nodes;
update the source code data based on the revised AST data;
generate a dataset of NL and abstracted code features as training data based on the updated source code data; and
train a language model on a sequence-to-sequence generation task based on the generated dataset.

* * * * *